United States Patent [19]

Hartman

[11] 4,169,077
[45] Sep. 25, 1979

[54] BARK EXTENDED PHENOL-FORMALDEHYDE RESINS AND MULTIPLE ALKALI ADDITION PROCESS FOR THE PREPARATION THEREOF

[75] Inventor: Seymour Hartman, Mahopac, N.Y.

[73] Assignee: Champion International Corporation, Stamford, Conn.

[21] Appl. No.: 910,656

[22] Filed: May 30, 1978

[51] Int. Cl.$^2$ .............................................. C08L 1/02
[52] U.S. Cl. ................................... 260/17.2; 428/529
[58] Field of Search ......................................... 260/17.2

[56] References Cited

U.S. PATENT DOCUMENTS

| | | | |
|---|---|---|---|
| 2,631,097 | 3/1953 | Redfern | 260/17.2 |
| 2,675,336 | 4/1954 | Stephan | 260/17.2 |
| 2,878,197 | 3/1959 | Baxter et al. | 260/17.2 |
| 2,930,772 | 3/1960 | Williams et al. | 260/17.2 |
| 3,213,045 | 10/1965 | Klein et al. | 260/17.2 |
| 3,268,460 | 8/1966 | Miller et al. | 260/17.2 |
| 3,371,054 | 2/1968 | Blickensderfer | 260/17.2 |
| 3,580,872 | 5/1971 | Lambuth | 260/17.2 |

OTHER PUBLICATIONS

Chem. Absts., vol. 68:14250x, Phenol-Formaldehyde Condensates, Brown et al.

*Primary Examiner*—Edward M. Woodberry
*Attorney, Agent, or Firm*—Evelyn M. Sommer

[57] ABSTRACT

A modified phenol-formaldehyde resin is formed by reacting phenol and formaldehyde in the presence of alkali and finely divided wood bark, preferably where the bark is pre-treated with alkali. The molar ratio of formaldehyde to phenol ranges from about 3 to 1.6. The molar ratio of alkali to phenol ranges from about 0.5 to about 1.0, said alkali being added to the formaldehyde-phenol mixture in three stages, each stage containing about one-third of the total alkali used. The amount of bark employed ranges from about 10 to about 40% of the amount of phenol. Adhesives prepared from these resins are suitable for use in the manufacture of plywood having both western mill and southern pine mill veneers.

20 Claims, No Drawings

BARK EXTENDED PHENOL-FORMALDEHYDE RESINS AND MULTIPLE ALKALI ADDITION PROCESS FOR THE PREPARATION THEREOF

BACKGROUND OF THE INVENTION

This invention relates to modified phenol-formaldehyde resins, their preparation, and their use in adhesive compositions for bonding plywood. More particularly, this invention relates to resins prepared by the reaction of phenol with formaldehyde in the presence of (preferably) alkali treated bark or untreated bark and alkali.

Phenol-formaldehyde resins have long been used in the preparation of adhesives for use in the wood industry such as, for example, in the manufacture of plywood, particle-board and hardboard. As a means of improving the quality of adhesives, while reducing their cost in order to improve the economics of the production of plywood and the like, the use of extenders has been developed. These extenders have included lignosulfonates, and bark. In general, most of the modified phenol-formaldehyde resins containing extenders were prepared by a process in which the extenders were added after the initial reaction of the phenol and formaldehyde to form polymethylolphenols. These processes are essentially two step operations whereby (1) the polymethylolphenol was prepared by the reaction of phenol and formaldehyde under alkali conditions and (2) the resin was modified by the addition of the appropriate extender. Such a process is described, for example, in U.S. Pat. No. 3,213,045. The fact that this process involves two steps reduces somewhat the economic attractiveness of employing extenders.

U.S. Pat. No. 2,675,336 describes a process of preparing a modified phenol-formaldehyde resin in which a redwood bark extract powder is admixed with the phenol and formaldehyde reactants. The redwood bark product employed is an extract obtained by treatment of bark with a suitable alkaline product and subsequent separation from the other components of the bark. This is therefore also essentially a two step process, in which the first step is the treatment of the bark.

U.S. Pat. No. 3,371,054 discloses modified phenol-formaldehyde resins which employ a bark derived product as an extender. The bark derived product is obtained by treating the bark at very high temperature with a high percentage of alkali in an inert atmosphere, separating out the fines, and then acidifying the bark to produce an "acid bark". The acid bark is then rendered alkaline again and then reacted with formaldehyde to produce a formaldehyde-acid bark intermediate product. This intermediate product can then be further reacted with additional phenol to produce a novolak-type resin. Thus, the modified phenol-formaldehyde resins taught by this patent also involve the use of a multi-step process.

In U.S. Pat. No. 4,045,386, I have described a process for preparing resinous adhesives comprising alkali treated bark, tannin and aldehydes. The process described is an in situ production of adhesives involving the condensation of tannin and aldehydes (notably paraformaldehyde) in the presence of finely divided bark and other adhesive constituents. Because of the presence of the various other adhesive constituents designed for use with specified wood veneers, the product and process described in U.S. Pat. No. 4,045,386 is limited to use only with western mill veneers such as Douglas fir. It does not provide a resin which can be used to prepare adhesives which will successfully bond all veneers used in the manufacture of plywood.

SUMMARY OF THE INVENTION

This invention provides a modified phenol-formaldehyde resin containing finely divided bark as an extender. In its preferred embodiment, the modified phenol-formaldehyde resin is prepared by a process consisting essentially of the following steps:

(1) refluxing a mixture of finely divided wood bark, a first portion of alkali and water, (2) cooling the mixture to a temperature between about 40° to 60° C., then adding phenol, formaldehyde, water and a second portion of alkali to the mixture and refluxing it until the viscosity reaches about 1,000 cps, (3) cooling the solution to a temperature between about 40° and 60° C., adding a third portion of alkali to the mixture and refluxing it until the viscosity again reaches about 1,000 cps, and (4) cooling the mixture to room temperature and adding a final portion of alkali with stirring to yield a mixture having a final viscosity of about 200 cps. The amount of alkali introduced in steps (1) and (2) combined, in step (3) and in step (4), each is about one-third of the total alkali used. The total molar ratio of alkali to phenol ranges from about 0.5 to about 1.0. The molar ratio of formaldehyde to phenol ranges from about 3 to about 1.6. The weight ratio of the bark to phenol ranges from about 1.6 to about 3.0. The weight ratio of the bark to phenol ranges from about 10 to about 40%. The alkali is preferably sodium hydroxide.

In a less preferred embodiment, steps (1) and (2) can be essentially combined, i.e., phenol, formaldehyde, water, one-third of the total alkali used and the bark can be mixed together and refluxed until the viscosity reaches about 1,000 cps. The second and third steps in this process are identical, respectively, to steps (3) and (4) described above.

DETAILED DESCRIPTION

Although the process of this invention is described, in its preferred embodiment, in terms of four process steps, it will readily be observed that this process provides a simplified means of obtaining a bark extended phenol-formaldehyde resinous product. An elaborate pretreatment of the bark is not required. All that is necessary is for the bark to be in a finely divided state when it is subjected to alkali pretreatment without the necessity of any separation of the pretreated intermediate product. The bark (preferably pretreated with alkali), the phenol and formaldehyde reactants, and additional alkali are then reacted to provide essentially one step formation of bark extended phenol-formaldehyde resin.

Wood bark of various different species of trees may be utilized, however, the bark of coniferous trees is preferred. Thus, for example, bark from various pines may be employed, such as southern pine, Ponderosa pine, sugar pine, slash pine, loblolly pine, short leaf pine, long leaf pine and white pine. Likewise, the barks of western hemlock, Douglas fir, oak, western white fir, Sitka spruce, coast redwood, eastern hemlock, and the like may be employed. The bark prior to use is reduced to a powder, having a particle size of 60–200 mesh and preferably 100 mesh.

The alkali used to pretreat the bark and in the condensation reaction is preferably sodium hydroxide in 50% aqueous solution. Other alkali products, however, may also be used in whole or in part such as, for example, potassium hydroxide, calcium oxide, magnesium oxide, sodium bicarbonate and the like.

The formaldehyde is preferably used in the form of a 37% solution.

In step (1) of the preferred process, i.e., the alkali pretreatment of the finely divided bark, the reaction is permitted to proceed for a minimum of about one-half hour. The reflux reaction may be permitted to proceed for a longer period of time but no apparent advantage is gained thereby.

In step (2), the reaction mixture is first cooled to a temperature of between about 40° and about 60° C., preferably around 50° C. The molar ratio of formaldehyde to phenol added can range from about 3 to about 1.6; conveniently, the ratio can be 2 moles of formaldehyde per mole of phenol. In steps (1) and (2), the combined amount of alkali added should be about one-third of the total amount to be used. When the alkali is sodium hydroxide, the final molar ratio of sodium hydroxide to phenol can range from about 0.5 to about 1.0 and should be preferably about 0.9.

In step (3), the refluxed mixture from step (2) is first reduced in temperature to a range between about 40° and about 60° C., preferably about 55° C. Again, the amount of alkali added should be about one-third of the total alkali employed.

In step (4), the temperature is reduced to around room temperature and the remaining alkali is added with stirring until the prescribed viscosity is obtained.

The modified phenol-formaldehyde resin of this invention contains finely divided bark particles ranging from about 10 to about 40%, preferably 10 to 20%, of the phenol employed.

The modified phenol-formaldehyde resins of this invention are employed, together with the usual other adhesive components, in the preparation of adhesives for use in the manufacture of plywood. One of the important advantages of this invention is the fact that the modified resins constitute a "universal" adhesive base for the manufacture of plywoods derived from various wood veneer products including, for example, Douglas fir and southern pine.

This invention will be better understood by reference to the following examples which are included here for purposes of illustration only and are not to be construed as limitations.

EXAMPLE I

A modified phenol-formaldehyde resin was prepared by forming a bark pre-mix comprising:
  32 grams of southern pine bark (average particle size about 100 mesh)
  100 grams water
  20 grams NaOH (50% aqueous solution)

The bark pre-mix was heated for one-half hour under reflux (80°–85° C.) and then cooled to 50° C. Thereupon, the following ingredients were added to the pre-mix:
  27.5 grams water
  243.9 grams formaldehyde (37%)
  160.2 grams phenol (88%)
  16.0 grams NaOH (50% aqueous solution)

The resulting mixture was heated to reflux until the viscosity thereof reached 1,000 cps. The mixture was then cooled to 55° C. and 36 grams of NaOH (50% aqueous solution) was added over a five minute period. The temperature was increased to reflux and viscosities were taken to follow the reaction. When the viscosity reached about 1,000 cps, the reaction was cooled to 55° C. and 36 grams of NaOH (50% aqueous solution) was added over a five minute period. The mixture was then cooled to room temperature where the viscosity was about 370 cps.

The above procedure was repeated employing differing amounts of bark, phenol and formaldehyde as set forth hereinabove to obtain similarly modified phenol-formaldehyde resins.

The characteristics of these resins were evaluated. These characteristics included percent free formaldehyde, pH, viscosity, and gel time. The results are as follows:

| Resin Characteristics | | | |
| --- | --- | --- | --- |
| % Free Formaldehyde Range | Gel Time (min.) | pH | Viscosity |
| .075–.3 | 17.1–45 | 12–12.7 | 200–1,000cps |

EXAMPLE II

The bonding qualities of the resins prepared according to Example 1 were evaluated by preparing plywood samples. General southern pine and western plywood adhesive formulas were prepared from the above-prepared resins, according to the following table.

| GENERAL GLUE MIX FORMULAS | | |
| --- | --- | --- |
| | Western Mill Glue Mix (grams) | Southern Mill Glue Mix (grams) |
| Water | 148.4 | 116.2 |
| Ground Corn Cobs | 63.2 | — |
| Ground Mixture of Corn Cobs and Rice Hulls | — | 61.2 |
| Wheat Flour | 21.3 | 34.9 |
| | Mix 5 Minutes | Mix 5 Minutes |
| Resin | 98.4 | 52.4 |
| | Mix 5 Minutes | Mix 5 Minutes |
| NaOH (50%) | 22 | 22.7 |
| | Mix 5 Minutes | Mix 5 Minutes |
| Soda Ash | 8.2 | — |
| | Mix 15 Minutes | Mix 15 Minutes |
| Resin | 325 | 412.5 |
| | Mix 5 Minutes | Mix 5 Minutes |

The glue spread on the western mill veneers, Douglas fir, was 27.2 kg (60 lbs.)/MDGL[1] and on the southern pine veneers was 36.3 kg (80 lbs.)/MDGL. The 5-ply plywood panels —30.4 cm×60.7 cm×1.7 cm (1'×2'×11/16") were prepared for both types of veneer. The assembly times ran from 10 to 30 minutes with a press schedule of 7 minutes, 138° C. (280° F.), and 185 psi for western mill veneer and 3½ minutes prepress, 7 minutes, 149° C. (300° F.), and 200 psi for southern pine veneers.

The panels were cut into standard shear samples and vacuum-pressure and boil tests were run. The results are given below, %WF indicating percent wood failure.
[1]MDGL=double glue line per 1,000 feet.

| | Western Mill Glue Mix | | | | Southern Mill Glue Mix | | | |
|---|---|---|---|---|---|---|---|---|
| | Vacuum Pressure | | Boil | | Vacuum Pressure | | Boil | |
| | psi | % WF | psi | % WF | psi | % WF | psi | % WF |
| Average Shear Values | 143.9 | 80 | 132.4 | 91.4 | 170.6 | 81 | 144.9 | 88.6 |

What is claimed is:

1. A modified phenol-formaldehyde resin prepared by a process consisting essentially of the steps of
   (1) refluxing a mixture of finely divided wood bark having a particle size of 60 to 200 mesh, a first portion of alkali and water,
   (2) cooling said mixture to a temperature between about 40° and about 60° C.; adding phenol, formaldehyde and water and a second portion of alkali to said mixture and refluxing it until the viscosity reaches about 1,000 cps,
   (3) cooling the mixture to a temperature between about 40° and about 60° C.; adding a third portion of alkali to said mixture and refluxing it until the viscosity reaches about 1,000 cps,
   (4) cooling said mixture to about room temperature and adding a final portion of alkali with stirring to yield a mixture having a final viscosity ranging from about 200 to 1,000 cps; the molar ratio of total alkali to phenol ranging from about 0.5 to about 1.0; the molar ratio of formaldehyde to phenol ranging from about 3 to about 1.6 and the weight ratio of bark to phenol ranging from about 10 to about 40%.

2. A phenol-formaldehyde resin according to claim 1 in which the alkali is sodium hydroxide.

3. A phenol-formaldehyde resin according to claim 1 wherein the amount of alkali introduced in steps (1) and (2) combined in step (3) and in step (4) each constitute about one-third of the total alkali used.

4. A phenol-formaldehyde resin according to claim 2 in which, in steps (2) and (3), the temperature ranges from about 50° to 55° C.

5. A phenol-formaldehyde resin according to claim 2 in which the molar ratio of sodium hydroxide to phenol is about 0.9.

6. A phenol-formaldehyde resin according to claim 2 in which the molar ratio of formaldehyde to phenol is about 2.0:1.

7. A phenol-formaldehyde resin according to claim 1 in which the weight ratio of the bark to phenol ranges from about 10 to 20%.

8. A modified phenol-formaldehyde resin prepared by a process consisting essentially of the steps of
   (1) refluxing a mixture of finely divided wood bark, a first portion of alkali, water, phenol and formaldehyde until the viscosity reaches about 1,000 cps,
   (2) cooling said mixture to a temperature between about 40° and about 60° C.; adding a second portion of alkali to said mixture and refluxing it until the viscosity reaches about 1,000 cps,
   (3) cooling said mixture to about room temperature and adding a final portion of alkali with stirring to yield a mixture having a final viscosity ranging from about 200 to 1,000 cps; the total molar ratio of alkali to phenol ranging from about 0.5 to about 1.0; the molar ratio of formaldehyde to phenol ranging from about 3 to about 1.6; and the weight ratio of the bark to phenol ranging from about 10 to about 40%.

9. A phenol-formaldehyde resin according to claim 8 wherein the amount of alkali introduced in step (1), in step (2) and in step (3) each constitute about one-third of the total alkali used.

10. A phenol-formaldehyde resin according to claim 8 in which the alkali is sodium hydroxide.

11. A process for preparing a phenol-formaldehyde resin, said process consisting essentially of the steps of
    (1) refluxing a mixture of finely divided wood bark, a first portion of alkali and water,
    (2) cooling said mixture to a temperature between about 40° and about 60° C.; adding phenol, formaldehyde, water and a second portion of alkali to said mixture and refluxing it until the viscosity reaches about 1,000 cps,
    (3) cooling said mixture to a temperature between about 40° and about 60° C.; adding a third portion of alkali to said mixture and refluxing it until the viscosity reaches about 1,000 cps,
    (4) cooling said mixture to about room temperature and adding a final portion of alkali with stirring to yield a mixture with a final viscosity ranging from about 200 to 1,000 cps; the total molar ratio of alkali to phenol ranging from about 0.5 to about 1.0; the molar ratio of formaldehyde to phenol ranging from about 3 to about 1.6; and the weight ratio of bark to phenol ranging from about 10 to about 40%.

12. A process according to claim 11 wherein the amount of alkali introduced in steps (1) and (2) combined, in step (3) and in step (4) each constitute about one-third of the total alkali used.

13. A process according to claim 11 in which the alkali is sodium hydroxide.

14. A process according to claim 13 in which, in steps (2) and (3) the temperature ranges from about 50° to about 55° C.

15. A process according to claim 13 in which the molar ratio of sodium hydroxide to phenol is about 0.9.

16. A process according to claim 13 in which the molar ratio of formaldehyde to phenol is about 2.0:1.

17. A process according to claim 9 in which the weight ratio of bark to phenol ranges from 10 to 20%.

18. A process for preparing a modified phenol-formaldehyde resin, which process consists essentially of the steps of
    (1) refluxing a mixture of finely divided wood bark, alkali, water, phenol and formaldehyde until the viscosity reaches about 1,000 cps,
    (2) cooling said mixture to a temperature between about 40° and about 60° C.; adding a second portion of alkali to said mixture and refluxing it until the viscosity reaches about 1,000 cps,
    (3) cooling said mixture to about room temperature and adding a final portion of alkali with stirring, to yield a mixture having a final viscosity ranging from about 200 to 1,000 cps; the total molar ratio of alkali to phenol ranging from about 0.5 to about 1.0; the molar ratio of formaldehyde to phenol ranging from about 3 to about 1.6; and the weight ratio of bark to phenol ranging from about 10 to about 40%.

19. A process according to claim 18 wherein the amount of alkali introduced in step (1), in step (2) and in step (3) each constitute about one-third of the total alkali used.

20. A process according to claim 18 in which the alkali is sodium hydroxide.

* * * * *

UNITED STATES PATENT AND TRADEMARK OFFICE
CERTIFICATE OF CORRECTION

PATENT NO. : 4,169,077
DATED : September 25, 1979
INVENTOR(S) : Seymour Hartman

It is certified that error appears in the above-identified patent and that said Letters Patent are hereby corrected as shown below:

In Column 5, line 10, the chart does not have the paragraph appearing beneath it and should be inserted as follows -- The results indicate that the bark modified resins of this invention can be successfully used to prepare both western mill and southern pine mill plywood. --

Signed and Sealed this

Sixth Day of May 1980

[SEAL]

Attest:

SIDNEY A. DIAMOND

*Attesting Officer*   *Commissioner of Patents and Trademarks*